(12) United States Patent
Nishimura et al.

(10) Patent No.: US 12,025,049 B2
(45) Date of Patent: Jul. 2, 2024

(54) THERMOSTAT DEVICE

(71) Applicant: NIPPON THERMOSTAT CO., LTD., Kiyose (JP)

(72) Inventors: Tetsuya Nishimura, Kiyose (JP); Tatsuya Takahata, Hiroshima (JP); Shinji Watanabe, Hiroshima (JP); Keita Watanabe, Hiroshima (JP); Takayuki Tominaga, Hiroshima (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 0 days.

(21) Appl. No.: 18/276,141

(22) PCT Filed: Feb. 16, 2022

(86) PCT No.: PCT/JP2022/006042
§ 371 (c)(1),
(2) Date: Aug. 7, 2023

(87) PCT Pub. No.: WO2022/176872
PCT Pub. Date: Aug. 25, 2022

(65) Prior Publication Data
US 2024/0093632 A1    Mar. 21, 2024

(30) Foreign Application Priority Data
Feb. 17, 2021    (JP) .................... 2021-023602

(51) Int. Cl.
*F01P 7/16*    (2006.01)
*F01P 7/14*    (2006.01)

(52) U.S. Cl.
CPC ........... *F01P 7/16* (2013.01); *F01P 2007/146* (2013.01)

(58) Field of Classification Search
CPC .............................. F01P 7/16; F01P 2007/146
See application file for complete search history.

(56) References Cited

U.S. PATENT DOCUMENTS 4,314,664 A * 2/1982 Wisyanski ........... G05D 23/022
                                              236/34.5
4,763,834 A * 8/1988 Duprez ................ G05D 23/022
                                              251/363

(Continued)

FOREIGN PATENT DOCUMENTS

EP        2811134 A1    12/2014
JP       S58-052372 U    4/1983

(Continued)

OTHER PUBLICATIONS

PCT/ISA/210, "International Search Report for PCT International Application No. PCT/JP2022/006042," Apr. 12, 2022.

(Continued)

*Primary Examiner* — Long T Tran
(74) *Attorney, Agent, or Firm* — HAUPTMAN HAM, LLP

(57) ABSTRACT

The thermostat device includes a housing including a first flow inlet that receives a coolant from a radiator, a second flow inlet that receives a coolant through a bypass passage, and a flow outlet of coolant in which each coolant is mixed; a thermo-element that is accommodated in the housing and moves in an axial direction depending on a temperature of the coolant from the second flow inlet; a control valve that controls amount of the coolant introduced from the first flow inlet as the thermo-element moves; a valve seat that is formed at a tip portion of an annular protrusion formed to protrude in a moving axis direction of the thermo-element in the housing and with which the control valve is in contact in a valve-closed state; and an annular groove formed by an annular gap provided outside of the valve seat and continuous in a circumferential direction.

2 Claims, 8 Drawing Sheets

(56) References Cited

U.S. PATENT DOCUMENTS

| | | | | |
|---|---|---|---|---|
| 5,018,664 | A * | 5/1991 | Butler | G05D 23/022 |
| | | | | 251/363 |
| 5,974,827 | A * | 11/1999 | Hosking | F25B 31/002 |
| | | | | 62/468 |
| 6,244,516 | B1 * | 6/2001 | Langervik | G05D 23/022 |
| | | | | 236/93 R |
| 9,133,755 | B2 * | 9/2015 | Liang | F01P 11/04 |
| 10,302,208 | B2 * | 5/2019 | Lamb | G05D 23/021 |
| 2005/0224592 | A1 * | 10/2005 | Inoue | G05D 23/1333 |
| | | | | 236/93 R |
| 2010/0012738 | A1 | 1/2010 | Park | |
| 2010/0132361 | A1 * | 6/2010 | Bouloy | G05D 23/022 |
| | | | | 264/328.8 |
| 2013/0126624 | A1 * | 5/2013 | Park | F01P 7/16 |
| | | | | 236/34.5 |
| 2015/0108229 | A1 * | 4/2015 | Auweder | G05D 23/02 |
| | | | | 236/34.5 |
| 2015/0211395 | A1 * | 7/2015 | Gooden | F01M 5/007 |
| | | | | 236/34.5 |
| 2017/0114706 | A1 * | 4/2017 | Okita | F01P 3/18 |

FOREIGN PATENT DOCUMENTS

| | | |
|---|---|---|
| JP | 2005-090726 A | 4/2005 |
| JP | 2012-184693 A | 9/2012 |
| JP | 2015-129560 A | 7/2015 |
| JP | 2019-183747 A | 10/2019 |
| WO | 2007/108273 A1 | 8/2009 |
| WO | 2013/114676 A1 | 8/2013 |
| WO | 2019/066759 A1 | 4/2019 |

OTHER PUBLICATIONS

Japan Patent Office, "Office Action for Japanese Patent Application No. 2021-023602," Jul. 19, 2023.

* cited by examiner

THERMOSTAT DEVICE

RELATED APPLICATIONS

The present application is National Phase of International Application No. PCT/JP2022/006042 filed Feb. 16, 2022, and claims priority from Japanese Application No. 2021-023602, filed Feb. 17, 2021, the disclosure of which is hereby incorporated by reference herein in its entirety.

TECHNICAL FIELD

The present invention relates to a thermostat device disposed in the middle of a circulation flow passage through which a coolant is circulated between an internal combustion engine (hereinafter referred to as an engine) and a radiator mounted on automobiles, for example, to control the coolant temperature appropriately.

BACKGROUND ART

A thermostat device is provided with a thermo-element incorporating a thermal expansion body (wax) expanding and contracting by sensing a temperature change in the coolant flowing through the circulation flow passage between the engine and the radiator and functions to maintain the coolant at a predetermined temperature by opening and closing a control valve (valve body) by volume change caused by expansion and contraction of the thermal expansion body.

Namely, a thermo-operating unit, including a thermo-element incorporating a thermal expansion body and a control valve, is accommodated in a housing and, for example, disposed at the inlet side of the coolant passage of the engine. The thermo-operating unit closes the control valve when the coolant temperature is low, and the coolant is circulated through the bypass passage without passing through the radiator.

Further, the thermo-operating unit opens the control valve to have the coolant circulate through the radiator when the coolant temperature rises. With this, the thermo-operating unit operates to control tyre temperature of tyre coolant through the water jacket, which is the coolant passage in the engine, to a proper state.

Therefore, this type of thermostat device includes a housing having a first flow inlet that receives the coolant from the radiator side, a second flow inlet that receives the coolant through a bypass passage not passing through the radiator, and a coolant supply port for supplying the coolant to the water jacket side of the engine by mixing the coolant from the first flow inlet and the coolant from the second flow inlet. Then, the thermo-operating unit having the control valve that controls the amount of the coolant introduced from the first flow inlet along with the thermo-element moving in an axial direction is accommodated in the housing (for example, Patent Literature 1).

FIG. 10 schematically illustrates the coolant flow in the housing of a conventional thermostat device.

The thermostat device 11 is constructed by accommodating the thermo-operating unit 15 in the housing 12 composed of a case 13 and an inlet 14.

On the inlet 14 side composing the housing 12, a first flow inlet 14a of the coolant from the radiator side is formed. Similarly, on the case 13 side composing the housing 12, a flow inlet 13a of the coolant from the bypass passage detouring the radiator is formed.

Then, the coolants from each flow inlet 13a and 14a are mixed in the housing 12 and delivered to the water jacket of the engine through the flow outlet 13b of the coolant.

Meanwhile, the thermo-operating unit 15 is provided with a thermo-element 15a (temperature-sensitive unit) incorporating a thermal expansion body (wax) reacting to the temperature of the coolant, a piston 15b advancing and retracting due to the action of the thermal expansion body, a disc-shaped control valve 15c (valve body) attached to the thermo-element 15a, and a spring member 15d biasing the control valve 15c to a closed state by abutting on the inlet 14 side.

Then, the tip end of the piston 15b is attached to the shaft support 14b formed in the inlet 14 and controls the valve-opened state of the control valve 15c depending on the temperature of the coolant applied to the thermo-element 15a, whereby the thermo-operating unit 15 operates to keep the coolant temperature applied to the engine to be appropriate by adjust g the flow-in amount of the coolant from the radiator side in particular.

CITATION LIST

Patent Literature

PTL 1: WO 2007/108273 A

SUMMARY OF INVENTION

Technical Problem

In this type of thermostat device 11, a cooled coolant from the radiator side flows into the housing 12 from the first flow inlet 14a and flows outside of the housing 12 from the flow outlet 13b and flows toward the engine side (Arrow C in FIG. 10).

Then, some thermostat devices 11 prevent the coolant from flowing in from the second flow inlet 13a when the degree of valve opening of the control valve 15c increases. At the start of the valve opening, a high-temperature coolant from the bypass passage side not passing through the radiator flows into the housing 12 from the second flow inlet 13a, flows outside of the housing 12 from the flow outlet 13b, and flows to the engine side.

In a case where the degree of valve opening of the control valve 15c is small, such as at the start of valve opening of the control valve 15c, if the cooled coolant from the radiator side goes around the thermo-element 15a side, the temperature around the thermo-element 15a drops, causing to reduce the sensitivity and responsivity to the temperature of the high-temperature coolant from the bypass passage side. In such a case, further, the temperature of a portion through which the cooled coolant passes drops locally, and variations in the temperature around the thermo-element 15a occur, whereby sensitivity to temperature and responsivity may be decreased, an operation of the control valve 15c may become unstable, and hunting may occur.

The present invention is made focusing on the technical problems of the conventional thermostat devices described above, and the object of the present invention is to provide a thermostat device capable of improving sensitivity to temperature and responsivity and suppressing unstable operation of a control valve and occurrence of hunting.

Solution to Problem

As described in claim 1, a thermostat device according to the present invention made to solve the problems described above includes:

a housing including a first inlet-side conduit in which an accommodation chamber is formed inside and a first flow inlet for introducing a coolant that is cooled by a radiator into the accommodation chamber is formed at one end, a second inlet-side conduit in which a second flow inlet for introducing a coolant heated in an internal combustion engine that does not pass through the radiator into the accommodation chamber is formed at one end, and an exit-side conduit in which a flow outlet of coolant for supplying the coolant in the accommodation chamber to the internal combustion engine is formed at one end;

a thermo-element that is accommodated in the accommodation chamber and moves in an axial direction depending on the temperature of the coolant;

a control valve that controls the amount of the coolant introduced from the first flow inlet as the thermo-element moves;

a valve seat that is formed at a tip portion of an annular protrusion formed to protrude in a moving axis direction of the thermo-element in the housing and with which the control valve comes into contact in a valve-closed state; and an annular groove constructed of a circumferentially continuous annular gap provided outside the valve seat, whose opening end is formed along the valve seat.

According to the invention described in claim 1, the valve seat on which the control valve abuts in the valve-closed state is formed at the tip portion of the annular protrusion. Then, the annular groove is formed by the annular gap provided outside the valve seat and continuous in the circumferential direction, and the opening end of the annular groove is formed along the valve seat.

Accordingly, in a state where the degree of valve opening of the control valve is small, most of the cooled coolant from the radiator side introduced into the first flow inlet is bounced back at a peripheral edge portion of the control valve, flows to circulate in the annular groove, and is caused to go toward the flow outlet of coolant.

Thus, it is possible to prevent the coolant from the radiator side from flowing toward a thermo-element side, and as a result, sensitivity to temperature and responsivity are improved, and as a result, it is possible to prevent the operation of the control valve from becoming unstable or the hunting from occurring.

In this case, as described in claim 2, it is desirable that on a one-end side of the moving direction of the thermo-element on an inner peripheral wall of the exit-side conduit, a slope is formed inclined toward the one-end side as approaching the accommodation chamber from the flow outlet side, and an accommodation-chamber-side end of the slope is preferably located in a range from a position of the valve seat toward the one-end side and configured to be continuous to a peripheral wall of the annular groove.

According to the invention described in claim 2, on the one-end side of the moving direction of the thermo-element on the inner peripheral wall of the exit-side conduit, the slope inclined toward the one-end side as approaching the accommodation chamber from the outlet side is formed, and the accommodation-chamber-side end of the slope is located in a range from the position of the valve seat toward the one-end side and configured to be continuous to the peripheral wall of the annular groove.

Accordingly, the coolant from the radiator side flowing to circulate in the annular groove is likely to flow out from the annular groove through the slope toward the flow outlet.

Therefore, the thermo-element is further less likely to be affected by the coolant from the radiator side and can contribute to further improvement of sensitivity to temperature and responsivity.

Then, in a preferred embodiment of the thermostat device according to the present invention, as described in claim 3, the housing is constructed to have a case and an inlet joined to the case, the annular protrusion is provided in the inlet so as to protrude into the case, and the annular groove is formed between the outer periphery of the annular protrusion and the inner circumferential surface of the case.

According to the invention described in claim 3, the annular groove can be formed in the housing by joining the inlet with the case constituting the housing.

Therefore, for example, when trying to obtain a housing made of resin, it is not necessary to process a special molding die for creating an annular groove in the housing, and it is possible to provide a product with reduced cost.

Advantageous Effects of Invention

According to the present invention, it is possible to provide a thermostat device in which sensitivity to temperature and responsivity can be improved and the operation of a control valve is stable.

DESCRIPTION OF EMBODIMENTS

Figure 1:
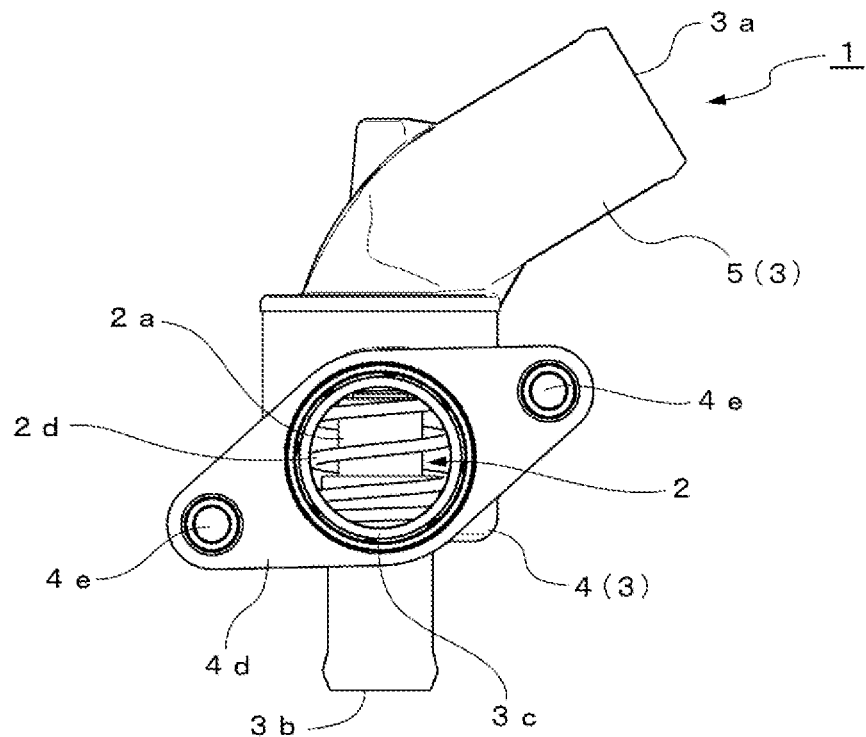
FIG. 1 is a front view illustrating an overall configuration of a first embodiment of a thermostat device according to the present invention.

A thermostat device according to the present invention will be described based on the embodiments illustrated in the drawings. FIGS. 1 through 7 show the first embodiment of the thermostat device 1, of which FIGS. 1 through 5 show the overall configuration of the thermostat device 1.

The thermostat device 1 is constructed so that a thermo-operating unit 2, which is placed in a circulation passage for circulating coolant between the engine and radiator and controls the temperature of the coolant supplied to the engine, is accommodated in a housing 3.

In other words, the thermostat device 1 is disposed at an intersection of the coolant passage from the radiator side and the bypass passage from the outlet of the engine side not passing through the radiator, and the coolant cooled by the radiator and the coolant heated at the engine passing through the bypass passage are mixed to control the temperature of the coolant to the inlet of the engine appropriately.

For the convenience of description, in the posture of the thermostat device 1 shown in FIG. 1, the upper/lower portion of the figure is simply expressed by the "upper"/ "lower."

In the embodiment, the housing 3 constituting the outer frame of the thermostat device 1 is composed of a case 4 and an inlet 5 that is joined and attached to the upper portion of the case 4, both of which are made of resin material.

The inlet 5 is provided with a first inlet-side conduit 3a having a first flow inlet 5a formed in a cylindrical shape that receives the coolant from the radiator side, and the first inlet-side conduit 3a is formed in an approximately 60 degrees bent state against the moving axis of a thermo-operating unit 2 described later (See FIGS. 1 and 2).

Further, in the case 4, a unit accommodating space 4a, which accommodates the thermo-operating unit 2 to be an accommodation chamber, is formed in the central area, and also a second inlet-side conduit 3b having a cylinder-shaped second flow inlet 4b downward from the unit accommodating space 4a; the coolant from the bypass passage is introduced to the second flow inlet 4b.

Further, in the case 4, an exit-side conduit 3c is formed, having a flow outlet 4c of the coolant to be supplied to the engine side toward the direction perpendicular to the moving axis of the thermo-operating unit 2.

The exit-side conduit 3c having the flow outlet 4c of the coolant is constructed enabling it to be arrayed on the upstream side of the water pump for delivering the coolant to the engine; for this purpose, a flange 4d for directly connecting the thermostat device 1 to the water pump side (not shown) and bolt insertion holes 4e (See FIGS. 4 and 5) for bolts for fastening at opposing positions by 180 degrees on the flange 4d are formed. An annular packing 4f to be joined with the water pump side is attached so as to surround the flow outlet 4c of the coolant along the opening.

A cylindrical-shaped thermo-element 2a (a temperature sensing unit) incorporating a thermal expansion body (wax) which expands and contracts depending on the coolant temperature is provided in the thermo-operating unit 2 accommodated in the unit accommodating space 4a of the housing 3; a piston 2b disposed along the axis of the thermo-element 2a operates to advance and retract from the thermo-element 2a due to the expansion and contraction of the thermal expansion body.

The tip end of the piston 2b is attached inside the housing 3 being fitted to a shaft support 5b formed at the upper central portion of the inlet 5 constituting the housing 3.

Thus, the cylindrical-shaped thermo-element 2a operates to move along the axial direction in the unit accommodating space 4a along with the advance and retraction of the piston 2b; that is, the thermo-element 2a moves up and down in the embodiment. In other words, the direction of the movement of the thermo-element 2a is vertical, and in the present embodiment, the one-end side of the moving direction of the thermo-element 2a in the claims is the up-side.

In addition, a disc-shaped control valve (valve body) 2c is attached to the upper side of the thermo-element 2a; a valve body formed on an outer peripheral edge of the control valve 2c is made to be the valve-closed state by abutting on an annular valve seat 5c formed at the lower opening of the inlet 5.

Further, a spring member 2d is disposed to surround the thermo-element 2a such that one end thereof comes into contact with the control valve 2c, and the other end of the spring member 2d abuts a case inner bottom 4g of the case 4 (See FIGS. 2 and 3) to surround the guide 4h formed to erect from the case inner bottom 4g of the case 4.

Accordingly, the spring member 2d applies a biasing force to the disc-shaped control valve 2c so as to press against the annular valve seat 5c formed on the inlet 5.

The guide 4h supports the lower part of the thermo-element 2a slidably. The guide 4h is provided with a hole, a groove, or a cutout not shown, and the coolant entering the housing 3 from the second flow inlet 4b can flow into the unit accommodating space 4a through the hole, the groove, or the cutout of the guide 4h.

According to thus-configured thermostat device 1, the coolant supplied to the second flow inlet 4b from the bypass passage side is mainly supplied to the thermo-element 2a.

When the coolant temperature from the bypass passage rises, the thermal expansion body incorporated in the thermo-element 2a expands, and the piston advances (protrudes).

This causes the control valve 2c attached to the thermo-element 2a retracts toward the second flow inlet 4b side, resisting the biasing force of the spring member 2d to open the valve, and the coolant through the radiator is introduced through the first flow inlet 5a.

Resultantly, the coolant from the first flow inlet 5a and the coolant from the second flow inlet 4b are mixed and delivered to the water jacket of the engine through the flow outlet 4c of the coolant. This allows controlling the coolant temperature through the water jacket of the engine to be in an appropriate state.

Figure 2:
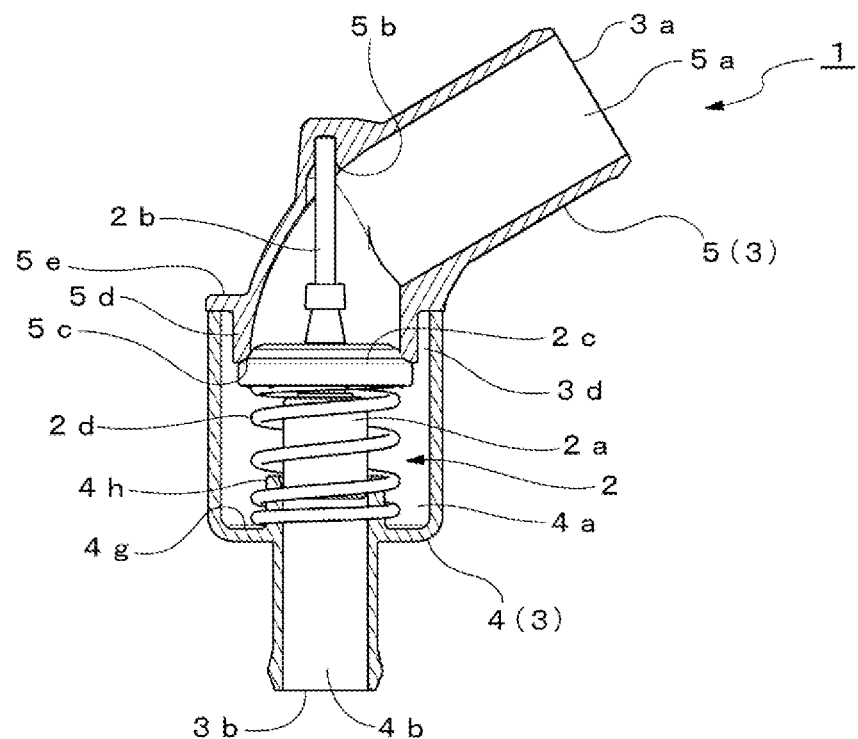
FIG. 2 is a partial cross-sectional view illustrating a front half portion of a housing in FIG. 1 cut away.
Figure 3:
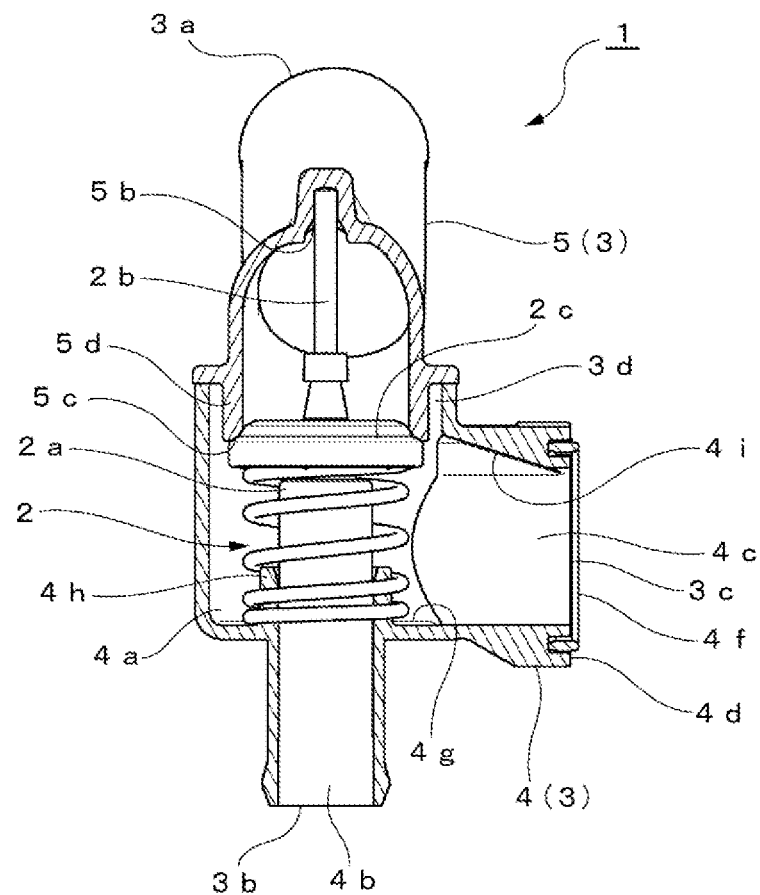
FIG. 3 is a partial cross-sectional view in which a left half portion of the housing is cut away and viewed from a cutting-away direction.
Figure 4:
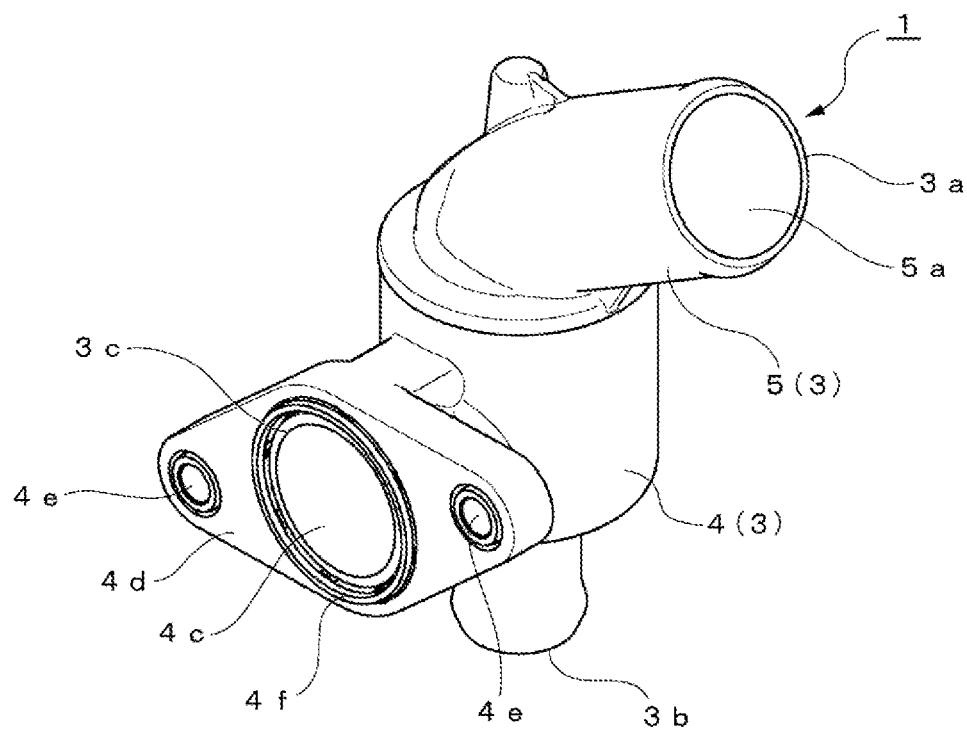
FIG. 4 is a perspective view illustrating an overall configuration of the thermostat device.
Figure 5:
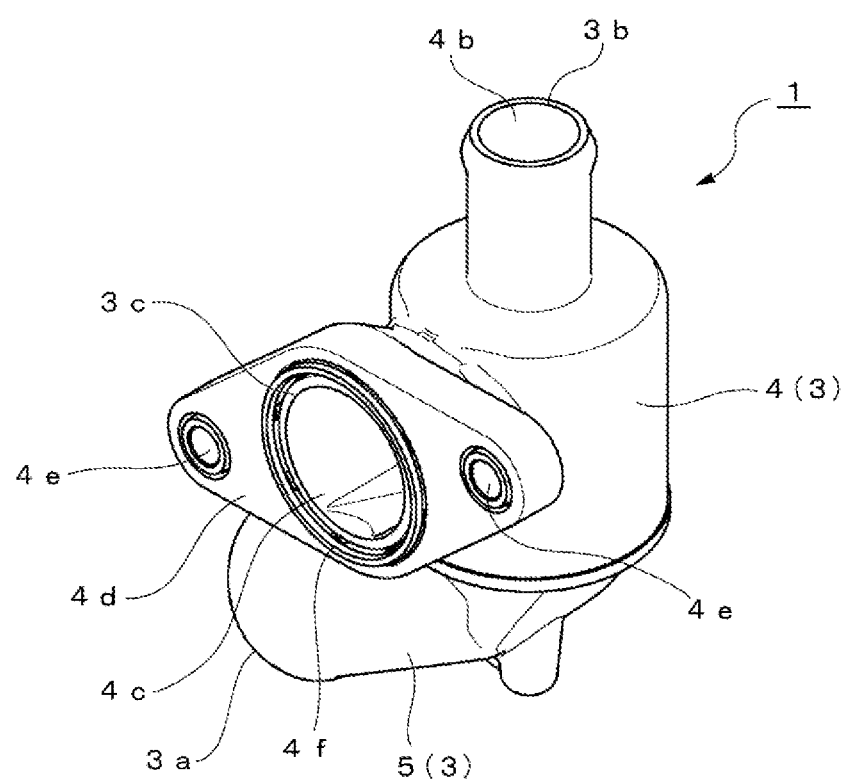
FIG. 5 is a perspective view of the thermostat in a state in which the top and bottom are inverted from the state illustrated in FIG. 4.

In this embodiment, as shown in FIGS. 2 and 3, the valve seat 5c, on which the control valve 2c abuts in the valve closed state, is formed at the tip portion of the annular protrusion 5d formed to protrude in the moving axis direction of the thermo-element 2a in the housing 3. Then, a lower-end opening (an opening end 3e) of the annular groove 3d is formed surrounding the valve seat 5c.

Furthermore, in the present embodiment, as shown in FIG. 3, the exit-side conduit 3c toward the flow outlet 4c of coolant from the valve seat 5c in the housing is formed in a direction orthogonal to the direction of the moving axis of the thermo-element 2a, and the accommodation-chamber-side end of the exit-side conduit 3c opposes to the side portion of the thermo-element 2a. In addition, a slope 4i having an upward slope from the flow outlet 4c side toward the annular groove 3d is formed in the upper portion of an inner peripheral wall of the exit-side conduit 3c.

Figure 6:
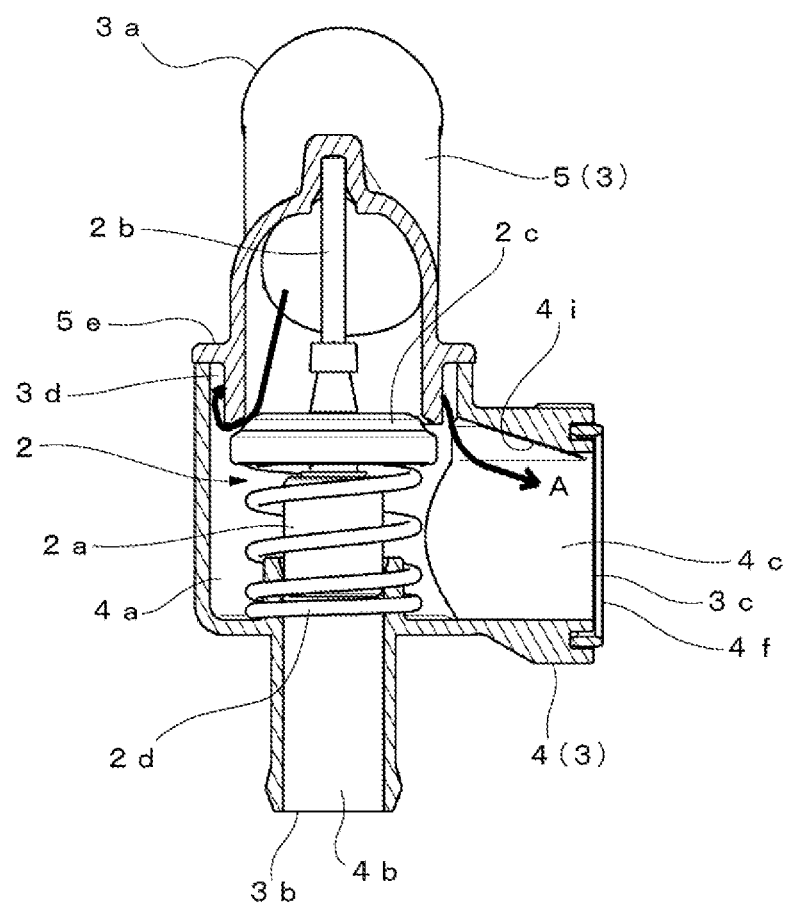
FIG. 6 is a partial cross-sectional view illustrating a flow of a coolant in a state where a control valve is opened.
Figure 7:
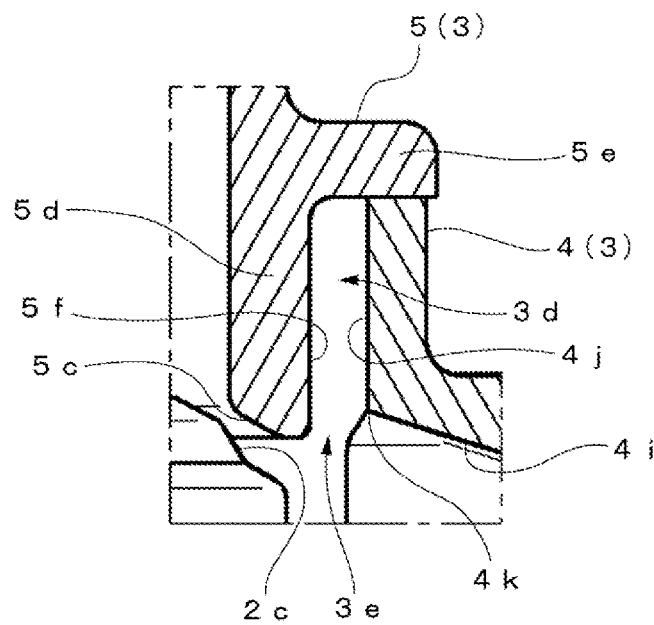
FIG. 7 is an enlarged cross-sectional view of an annular groove and a slope portion.

The annular groove 3d and the slope 4i are also illustrated in FIGS. 6 and 7 in which the control valve 2c is in a state of being slightly separated from the valve seat 5c and opened.

In particular, FIG. 7 illustrates the annular groove 3d and a part of the slope 4i in an enlarged state, and the annular groove 3d is formed at a joint portion between the case 4 and the inlet 5 constituting the housing 3.

More specifically, the inlet 5 has a brim 5e whose outer diameter is larger compared to the other portions; the brim 5e is joined to the upper-end opening edge of the case 4 by welding, for example, whereby the case 4 and the inlet 5 are integrated as the housing 3. Further, the annular protrusion 5d is provided on the inlet 5 and protrudes from an inner peripheral end of the brim 5e into the case 4. The outer diameter of the annular protrusion 5d is smaller than the upper inner diameter of the case 4 located on the outer periphery thereof, and an annular gap continuous in the circumferential direction is formed on the outer periphery of the annular protrusion 5d, and this gap is the annular groove 3d.

Therefore, in this embodiment, the annular groove 3d is formed between an outer periphery 5f of the annular protrusion 5d and an inner circumferential surface 4j of the case 4, and the opening end 3e of the annular groove 3d is disposed outside to surround the valve seat 5c.

Further, the valve seat 5c is formed at the tip of the annular protrusion 5d, and the wall thickness of the annular protrusion 5d and the brim 5e constituting the inlet 5, the portion connected to the first inlet-side conduit 3a from the annular protrusion 5d and the brim 5e, and the first inlet-side conduit 3a are formed generally uniform in thickness, so that dimensional accuracy can be improved when the inlet 5 is formed of synthetic resin.

Further, the brim 5e protruding outward from a base end (the opposite side of the tip) of the annular protrusion 5d is welded to the case 4. As described above, since the valve seat 5c is formed at the tip of the annular protrusion 5d, the valve seat 5c can be separated from a welding portion. As a result, this allows, even in a state where the control valve 2c and the valve seat 5c are abutting each other, to prevent the leaking of coolant from therebetween, because of the distortion of the valve seat 5c caused by welding.

Meanwhile, the accommodation-chamber-side end 4k of the slope 4i is located in a range from the position of the valve seat 5c toward the one-end side (the upper side in FIG. 7) in the moving direction of the thermo-element 2a, and the accommodation-chamber-side end 4k is continuous to the peripheral wall of the annular groove 3d.

In other words, a configuration is adopted that the accommodation-chamber-side end 4k (an upper end) of the annular groove 3d side of the slope 4i is located above the lower end of the valve seat 5c.

According to the arrangement configuration of the annular groove 3d and the slope 4i, in a state where the degree of valve opening of the control valve 2c is small, the cooled coolant from the radiator side introduced into the first flow inlet 5a is bounced back at the peripheral edge portion of the control valve 2c, flows to circulate in the annular groove 3d as indicated by an arrow reaching direction A in FIG. 6, and thereafter, is caused to go toward the flow outlet 4c of coolant.

Therefore, it is possible to prevent the coolant from the radiator side from flowing toward the thermo-element 2a side. As a result, sensitivity to temperature and responsivity of the thermostat device 1 are improved, and it is possible to prevent the operation of the control valve 2c from becoming unstable or the hunting from occurring.

Further, the slope 4i is formed in the exit-side conduit 3c forming the flow outlet 4c of coolant, and the accommodation-chamber-side end 4k of the slope 4i on the accommodation chamber 4a side is located in a range from the position of the valve seat 5c toward the first flow inlet 5a side in the moving axis direction of the thermo-element 2a and is continuous to the opening end 3e of the annular groove 3d, so that the coolant from the radiator side flowing to circulate in the annular groove 3d flows out from the annular groove 3d toward the flow outlet 4c through the slope 4i without resistance.

Therefore, the thermo-element 2a is less likely to be affected by the coolant from the radiator side and can contribute to further improvement of sensitivity to temperature and responsivity, stability of the operation of the control valve 2c, and suppression of the hunting.

In the thermostat device 1 of the first embodiment described above, the inlet 5 and the case 4 which constitute the housing 3 are both made of a resin material as already described; the inlet 5 and the case 4 are preferably joined by welding, but the joining method can be appropriately changeable. Further, the inlet 5 and the case 4 can also be constructed using a metal material, for example.

Figure 8:
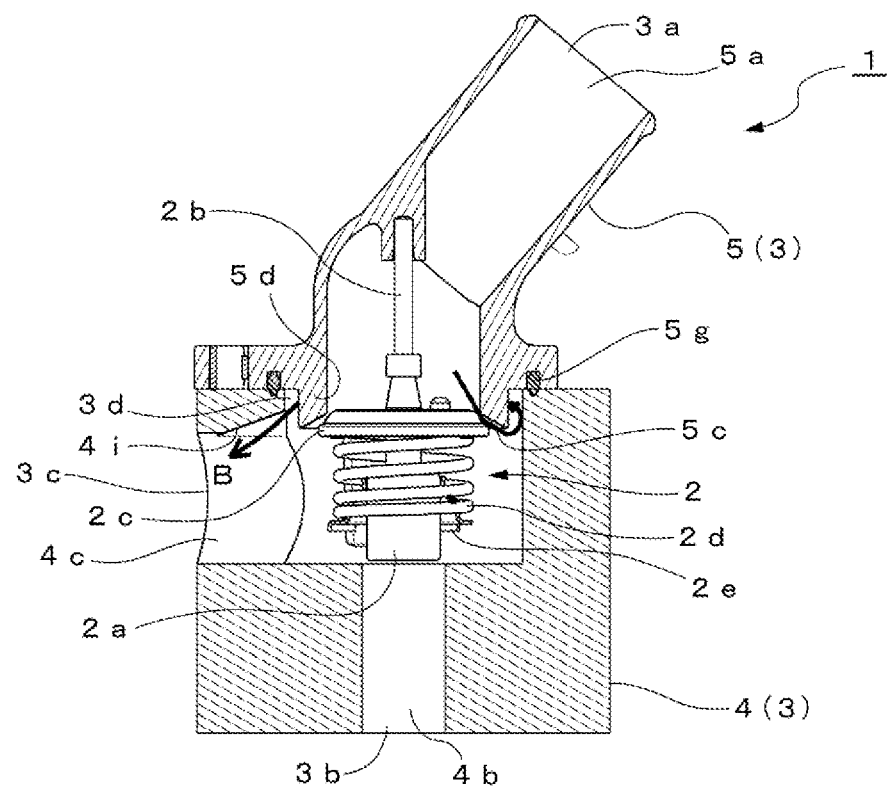
FIG. 8 is a partial cross-sectional view illustrating a main part of a second embodiment of the thermostat device according to the present invention.
Figure 9:
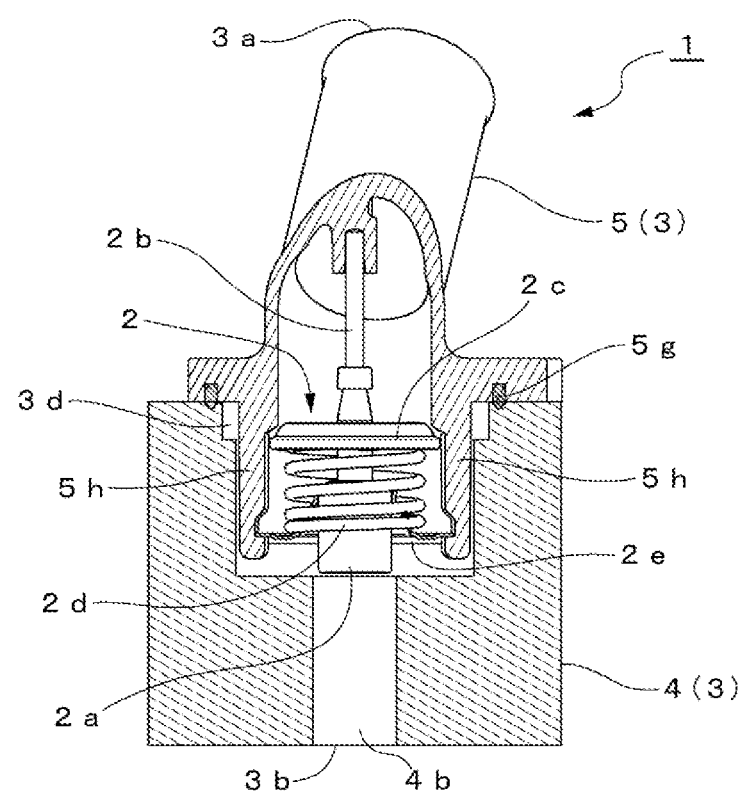
FIG. 9 is a partial cross-sectional view of the thermostat in FIG. 8, in a state axially rotated by 90 degrees.
Figure 10:
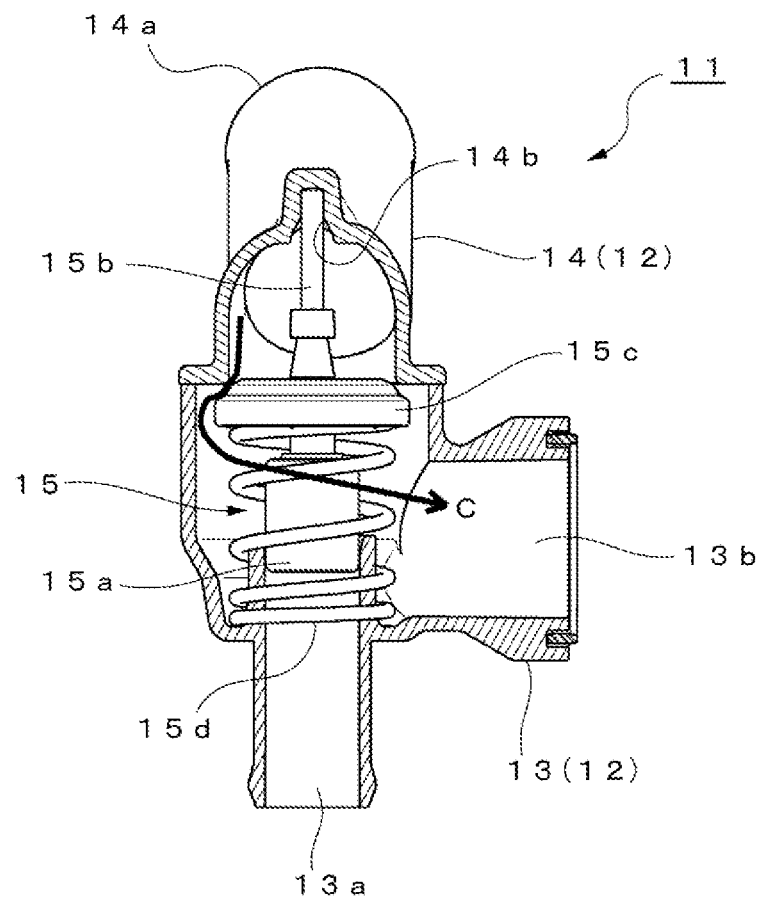
FIG. 10 is a partial cross-sectional view illustrating an embodiment of the flow of the coolant in a conventional thermostat device.

FIGS. 8 and 9 illustrate a thermostat device 1 of a second embodiment according to the present invention. In FIGS. 8 and 9 illustrating the second embodiment, members perform the same functions as those of the thermostat device 1 of the first embodiment shown in FIGS. 1 through 7 as already described are denoted by the same reference numerals, and therefore, the detailed descriptions thereof will be appropriately omitted.

In the thermostat device 1 according to the second embodiment, the case 4 and the inlet 5 constituting the housing 3 are both made of a metal material and are joined to each other through a packing 5g annularly embedded in the inlet 5.

Further, in the thermostat device 1 of the second embodiment, the other end portion of the spring member 2d biasing the control valve 2c toward the valve seat 5c side is received by the spring receiving member 2e; a configuration is adopted that the spring receiving member 2e is supported by an opposing pair of legs 5h (see FIG. 9) integrally formed with the inlet 5.

Also in the thermostat device 1 of the second embodiment, as shown in FIG. 8, a valve seat 5c is formed at the tip portion of the annular protrusion 5d formed to protrude in the moving axis direction of the thermo-element 2a, and an annular groove 3d is formed surrounding the valve seat 5c.

Furthermore, in the exit-side conduit 3c forwarding from the annular groove 3d to the flow outlet 4c of coolant, the slope 4i being inclined toward the one-end side in the moving direction of the thermo-element 2a as approaching the accommodation chamber 4a from the flow outlet 4c side is formed, and the accommodation-chamber-side end 4k of the slope 4i on the accommodation-chamber side is located in a range from the position of the valve seat 5c toward the one-end side and is continuous to the peripheral wall of the annular groove 3d.

Accordingly, also in the thermostat device 1 according to the second embodiment, the coolant flowing toward the flow outlet 4c side along with the opening of the control valve 2c flows so as to flow around along in the annular groove 3d as indicated by an arrow reaching direction B in FIG. 8, and flows out from the annular groove 3d toward the flow outlet 4c through the slope 4i without resistance.

Thus, similarly to the thermostat device 1 of the first embodiment, the thermo-element 2a is less likely to be affected by the coolant from the radiator side, and as a result, the thermostat device 1 can be provided in which sensitivity to temperature and the responsivity are improved and occurrence of hunting can be suppressed.

Note that, in the thermostat device 1 of the first embodiment and the second embodiment, a configuration is adopted that the exit-side conduit 3c toward the flow outlet 4c of coolant from the valve seat 5c in the housing 3 is formed in a direction orthogonal to the moving axis direction of the thermo-element 2a. However, this angle does not necessarily need to be the right angle; an appropriate angle can be selected and a similar function and effect can be obtained.

INDUSTRIAL APPLICABILITY

As described above, the thermostat device according to the present invention is useful as a device for supplying the coolant to the engine of automobiles and is particularly suitable for the use of controlling the temperature of the coolant to be supplied to the engine to an appropriate state.

REFERENCE SIGNS LIST

1 Thermostat device
2 thermo-operating unit
2a thermo-element
2b piston
2c control valve (valve body)
2d spring member
2e spring receiving member
3 housing
3a first inlet-side conduit
3b second inlet-side conduit
3c exit-side conduit
3d annular groove
3e opening end
4 case
4a unit accommodating space (accommodation chamber)
4b second flow inlet
4c flow outlet
4i slope
4j inner circumferential surface
4k accommodation-chamber-side end
5 inlet
5a first flow inlet
5c valve seat
5d annular protrusion
5f outer periphery
5h leg

The invention claimed is:

1. A thermostat device comprising:
a housing inside which an accommodation chamber is formed, including a first inlet-side conduit in which a first flow inlet for introducing a coolant that is cooled by a radiator into the accommodation chamber is formed at one end, a second inlet-side conduit in which a second flow inlet for introducing a coolant heated in an internal combustion engine that does not pass through the radiator into the accommodation chamber is formed at one end, and an exit-side conduit in which a flow outlet of coolant for supplying the coolant in the accommodation chamber to the internal combustion engine is formed at one end;
a thermo-element that is accommodated in the accommodation chamber and moves in an axial direction depending on the temperature of the coolant;
a control valve that controls amount of the coolant introduced from the first flow inlet as the thermo-element moves;
a valve seat that is formed in a tip portion of an annular protrusion formed to protrude in a moving axis direction of the thermo-element in the housing and on which the control valve abuts in a valve-closed state; and
an annular groove constructed of a circumferentially continuous annular gap provided outside the valve seat, whose opening end is formed along the valve seat,
wherein the housing is constructed to have a case and an inlet joined to the case, the annular protrusion is provided in the inlet so as to protrude into the case, and the annular groove is formed between the outer periphery of the annular protrusion and the inner circumferential surface of the case, and
wherein the first flow inlet and the valve seat are formed at the inlet of the housing.

2. The thermostat device according to claim 1, wherein on a one-end side of a direction in which the control valve approaches the valve seat in an inner peripheral wall of the exit-side conduit, a slope inclined toward the one-end side as approaching the accommodation chamber from a flow outlet side is formed, and
an accommodation-chamber-side end of the slope is located in a range from the position of the valve seat toward the one-end side and is continuous to a peripheral wall of the annular groove.

* * * * *